INVENTORS
ANDRE DO HUU CHAN AND
ROGER-EMILE LAMBERT
BY Albert L. Krey
ATTORNEY

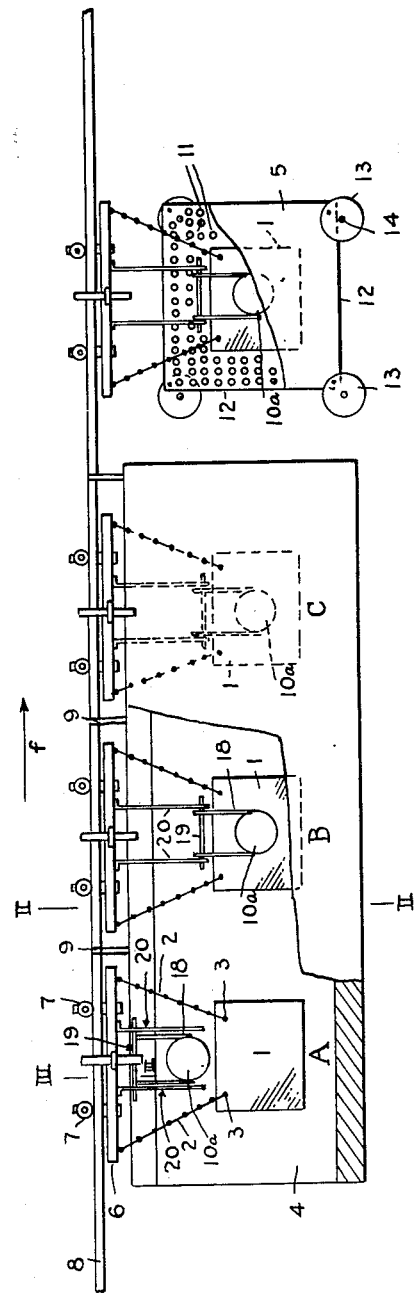
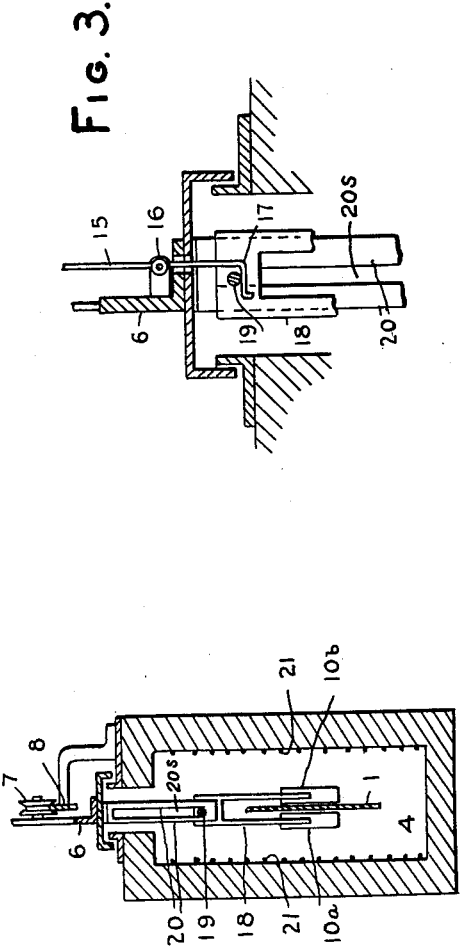

Jan. 28, 1964 ANDRE DO HUU CHAN ETAL 3,119,680
APPARATUS FOR TEMPERING GLASS
Original Filed June 10, 1952 3 Sheets-Sheet 3
Fig. 11.
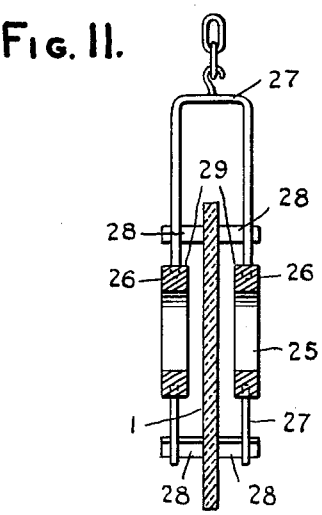
Fig. 12.
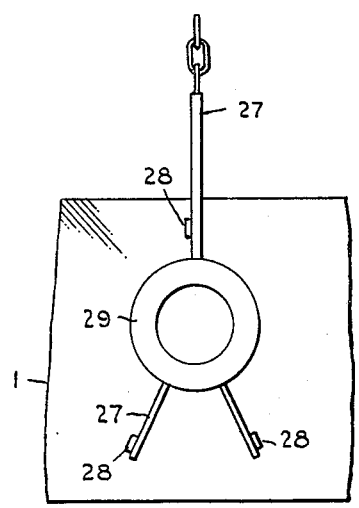
Fig. 13.
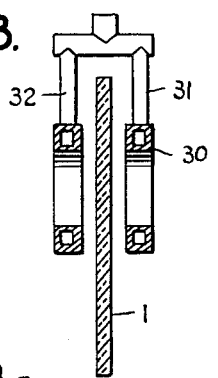
Fig. 14.
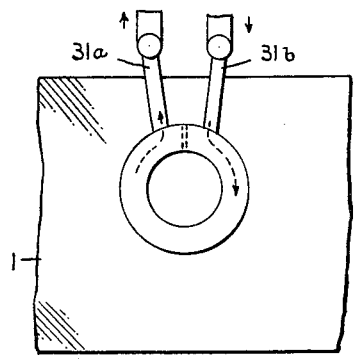
Fig. 8a.
Fig. 15.
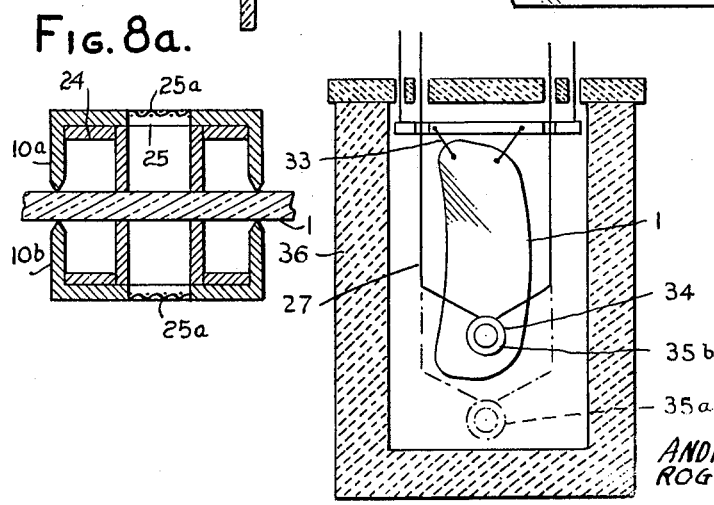
INVENTORS
ANDRE DO HUU CHAN AND
ROGER-EMILE LAMBERT
BY Albert L. Krey
ATTORNEY

United States Patent Office 3,119,680
Patented Jan. 28, 1964

3,119,680
APPARATUS FOR TEMPERING GLASS
André Do Huu Chan, Welkenraedt, Belgium, and Roger-Emile Lambert, Paris, France, assignors to Compagnie de Saint-Gobain, Paris, France
Original application June 10, 1952, Ser. No. 292,704, now Patent No. 2,910,807, dated Nov. 3, 1959. Divided and this application July 27, 1959, Ser. No. 840,215
Claims priority, application France June 15, 1951
20 Claims. (Cl. 65—349)

The present invention concerns generally, the manufacture of objects of tempered glass, i.e., of objects of glass in which a state of stresses (compressions and tensions) is set up by heating these objects to a temperature approaching softening and then subjecting them immediately to rapid cooling or chilling. Such objects have, as is well known, remarkable mechanical properties.

In particular, when glass windows and windshields of vehicles are involved, the glass tempered under the recited conditions, is characterized in the case of shock, by being very strong and, if it does break, will shatter into small fragments harmless to the occupants of the vehicle. This particular fragmentation, which is a safety factor offered by this type of window, can, however, if it is very fine, produce an unfavorable change in visibility at the moment it shatters or breaks into fragments.

To remedy this drawback attempts have been in the past to make glass windows and windshields in which certain areas remain untempered or of less temper than the remaining area, so that in the case the whole sheet breaks, the untempered or less tempered areas are not shattered in fragments or are shattered in relatively large pieces and leave enough visibility for the driver.

It also has been suggested to subject the parts to be reserved and the zones around them, to a different thermal treatment in order to produce a more energetic temper in those parts which are termed herein" environal zones" than in the parts to be reserved. However, the products obtained so far by this process are not always stable and are apt to show a certain sensitivity to shock and considerably lower resistance with respect to that of a product tempered in uniform manner.

Applicants have established that the instability is due to the fact that the stresses which arise from the difference in thermal treatment between the reserved parts and the environal zones are susceptible of stressing the reserved parts in tension. Now, it is known that when the glass is not tempered at all or only a little, as in the reserved part, it resists with difficulty to such tensile stresses.

The present invention has for an object, the manufacture of tempered glass, in particular, for windshields and windows of vehicles, having reserved parts untempered or slightly tempered and tempered environal parts, the process consisting in controlling the treatment of heating and/or of cooling or chilling in such a way that at the moment that the glass of the environal zone solidifies throughout its thickness, the temperature of the glass of the reserved part is lower or, at the most, equal to the temperature of the environal zone, as a result of which each reserved part is compressed by the environal zone acting in the manner of a hoop or ring or at least is not subjected to tensile stresses by the portion constituting the environal zone.

In this case, no stress, and in particular, no tension can develop between the reserved part and the environal zone, up to the moment of solidification of the environal zone, since it is still in the plastic state. On the other hand, from this moment and up to complete cooling, the reserved part, which starts cooling from a much lower initial temperature than the environal zone and therefore contracts less than the other, can exert no tensile stress on the said zone, but on the contrary is compressed by the latter acting in the manner of a hoop. If, while bearing in mind the tempering requirements for the environal zone, the operation is effectuated in the limiting conditions consisting of solidifying at the same instant of the reserved part and the environal zone, both experience the same temperature drop and consequently return to ambient temperature without one exerting any tension on the other.

Different modes of realizing the process of the invention can be employed by differentiating the treatment of the reserved parts with respect to the environal zones, either during the heating period or the cooling period, or during both.

Thus, for example, the heating of the reserved part can be moderated so that its temperature at the end of the heating period is lower than the temperature of the environal zone which is raised to a temperature close to that of softening, sufficient for it to take the temper. It is to be understood that the difference of temperature between the reserved part and the environal zone must be sufficient so that, in the course of the subsequent cooling, the glass of the reserved part be at a temperature lower or at most equal to that of the environal zone at the moment where this environal zone solidifies in its whole thickness. In this case, the heating of the reserved part may be sufficiently moderated so that, at the end of the heating period, the temperature of the reserved part be lower than the solidification temperature. (The term solidification point or temperature as used herein refers to the point or temperature at which the glass is hard enough to support stresses for long periods of time without plastic deformation. This temperature is also referred to as the strain point or temperature at which the glass viscosity is $4 \times 10^{14}$ poises).

It is also possible to carry out the heating operation in such a manner that, at the end of the heating operation, the reserved part be at a temperature higher than the solidification temperature. The advantage of this second method is that, at the beginning of the cooling, the reserved part, being at a temperature higher than the solidification temperature, is still plastic and is liable to yield in a certain measure to the temporary strains developed at this time in the superficial layers of the glass. Consequently the risks of breakage which may result from these strains is practically avoided. The cooling following the heating operation may be uniform over the entire surface of the glass.

By way of contrast, the reserved part and the environal zone can be heated uniformly and raised to a temperature near to softening and their cooling differentiated. In that event the reserved part must be cooled in advance so that it solidifies before the environal zone, the cooling of the reserved part during solidifying being nevertheless slow enough so that this zone be not or slightly tempered while the subsequent cooling or chilling of the environal zone is rapid enough to temper this zone. In this case, there is obtained the same advantage as in the preceding, the reserved part being at the beginning of the cooling operation at a temperature higher than the solidification temperature.

Additionally, both heating and cooling of the reserved part can be moderated. Applicants have obtained excellent results by fitting the object, in this case a sheet of glass, with a double screen which protects the two faces of the zone to be reserved against the heat in the furnace and from contact with the cooling fluid during the cooling period. The screen, placed sufficiently in time during the heating period, succeeds in keeping the part to be reserved, cool enough with respect to the environal zone, so that during the cooling period which follows the heating, and at the moment where the environal zone solidifies, the temperature of the reserved part is below or, at the most, equal to the temperature of solidification. Moreover, the presence of the screen during cooling, by moderating the cooling effect on the reserved part at the moment of solidifying, makes it possible to obtain a reserved part that is not or only slightly tempered.

If it is assumed that the temperature of solidification of the glass involved, is approximately 450° C., a screen can be so chosen that its protective power and its time of action during heating is sufficient to keep the part to be reserved at a temperature of about 450° C., while the rest of the sheet is raised to approximately its softening temperature, 650°–700° C., for example. The temperatures herein given as examples are those approximating if not identical with temperatures usually accorded soda lime glasses. A slight increase in temperature, from 450° to 500° C., is permissible for the reserved part on account of the cooling which it may undergo, in spite of the screen, between the end of the heating period and the moment where the intense cooling or chilling solidifies the environal zone. Further, this increase of temperature can be greater in case it is desired to have at the end of the heating period, the reserved part at a temperature higher than the solidification temperature.

To realize the desired difference in temperatures, the screen can be placed from the start of the heating period over the part to be reserved, but then certain precautions must be taken to avoid breakage of the glass at the start of heating, for example, by controlling the heating according to a sufficiently slow rate. Applicants have been able to apply very rapid heating means in making tempered glass of the type involved, by taking the precaution of inserting the screen during heating only after a certain lapse of time during which the sheet of glass is evenly heated without screening. As in an electric radiation furnace where the normal time of heating of a sheet of glass is about 4 minutes, applicants have been able, without danger of breakage, to introduce the screen after 1 minute of heating, and let it remain during the last three minutes of heating.

In this instance the applicants used a screen completely opaque to heat rays, such as an asbestos plate, for example. During the three minutes during which the sheet, with exception of the reserved part, could be raised to a temperature of 650° C., the reserved part is not raised to a temperature above that of 450° to 500° C., necessary for having this reserved part at 450° C., at the moment of solidification of the environal zone.

But in order that the article, namely a glass sheet, is not warped practically by the thermal treatment which forms the present invention, the applicants have verified that it is advantageous to use the screen during the heating period, only after a uniform heating as long as possible, i.e., after the heating without any screen. It is always understood that the reserved part, during the cooling, reaches a temperature lower or at most equal to the temperature of the environal zone when said zone solidifies throughout its thickness.

The applicants have ascertained that this result may be reached by controlling the characteristics of the screen and its use by increasing its thermal efficiency. Thus, the different following methods have successfully been applied:

Thick metal screens are used, for instance 10 mm. thick or more, which have thus a great absorbing capacity for heat which enables them to stay in the heating furnace during the heating period, without their temperature exceeding 400° C., for example, while glass that is freely exposed to the heat of the furnace reaches 650° to 700° C. during the same time.

During the period comprised between two successive placings of the screen on the glass sheet, the screen is cooled outside the furnace.

If the screen should stay in the heating furnace before being placed on the glass sheet during the heating period, within said furnace is provided a housing with heat insulating walls for lodging the screen before it is brought on the glass sheet. The insulating walls of said housing shelter the screen against the direct radiation of the heating members of the furnace, for example, against radiation from electrical resistances.

The screen is shaped as a hollow plate or organ and a cooling fluid such as air passes therein for its cooling, either during its stay in the heating furnace, or also when it is applied on the glass surface.

When a housing is provided in the furnace for sheltering the screen before carrying it on the glass sheet, the walls of said housing may also be made of hollow metal walls wherein a cooling fluid, such as air, may be passed.

With such means used separately, or in combination, for example for the above case where the heating period for the usual tempering lasts 4 minutes, the applicants could carry the screen on the glass sheet only 3 minutes after the heating begins, i.e., to put it into action only during the last minute, thus enabling to keep the initial planimetry of this glass sheet unchanged.

Another operational method consists in starting with previously tempered glass. Applicants have in fact, verified that the previously tempered state prevents the glass from breaking at the start of heating so that such glass fitted initially with a screen, can be placed in a quick heating furnace.

According to a special mode of realisation of the present invention, the untempered or slightly tempered reserved part which, as said, is surrounded by the so-called environal zone, tempered, which binds it, can have the form of a closed continuous band in the form of a ring or annulus and surrounding a tempered central area. As the previously described versions, this product is obtained by regulating the heating and/or cooling conditions of the temper in such a way that the ring to be reserved is at a temperature lower or, at most, equal to that of the environal zone at the moment when the latter solidifies. Of course, the solidification of the environal zone and of the central area bounded by the ring must be rapid enough to cause their temper, while the cooling of the reserved annular part must be manipulated in such a way that it is not or only slightly tempered.

By way of example, the following description concerns a mode of realization of the invention in the case of a sheet of glass, which consists in regulating the temperature of the part to be reserved by placing a screen close to or against each side of the sheet during heating.

This application is a division of original application Serial No. 292,704, filed June 10, 1952, Patent No. 2,910,807.

FIG. 1 represents the heating and cooling apparatus in side view with a part of the furnace broken away.

FIG. 2 is a vertical section view of the heating furnace along the line II—II of FIG. 1.

FIG. 3 is a detail, in vertical section, along the line III—III of FIG. 1.

Figure 8:
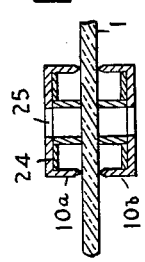

FIG. 8$^a$ is a modified form of the screen represented in FIG. 8.

Figure 10:
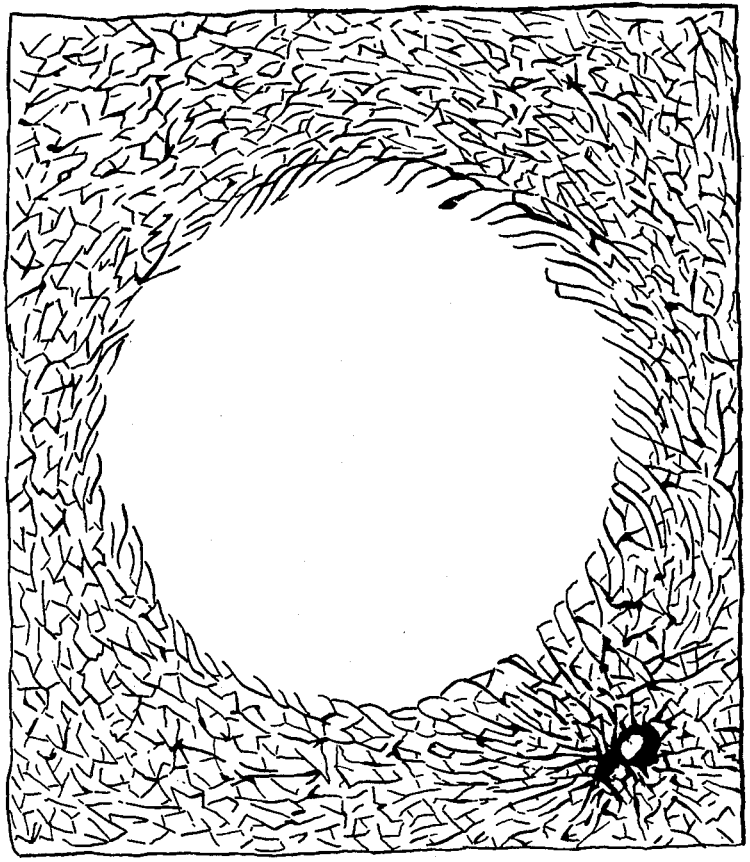
Figure 6:
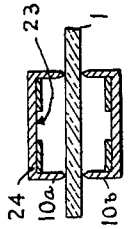
FIGS. 4, 5, 6, 7, 8 and 9 represent various types of screens in transverse section and elevation.

FIG. 10 is a side view representing the appearance of a sheet of glass having been submitted to a treatment according to the invention and which was broken by shock in the environal zone.

FIGS. 11, 12, 13 and 14 represent, in vertical sections and front view types of screens which are particularly apt to avoid the deformation of the glass sheet during the thermal treatment according to the invention.

FIG. 15 is a vertical view of an arrangement for placing the screen in relation to the glass sheet.

The sheets of glass 1 suspended normally as usual from two small chains 2 terminating in clamps 3 are moved horizontally in the furnace 4 according to the arrow $f$.

The design represents three positions A—B—C which each sheet occupies successively during the process of heating. At the furnace exit is the cooling or chilling apparatus 5 inside of which each sheet takes its place after heating.

To assure the travel of the sheet, the rod 6, to which are attached the small chains 2, may be an associated part of a carriage which, through rollers 7, rolls over a horizontal rail 8 supported by brackets 9 mounted on the furnace or in any other suitable way. A screen consisting of two symmetrical parts 10a and 10b serves to mask the part of the sheet of glass that is to be untempered or slightly tempered. The example in question refers to the treatment of a sheet which, originally was glass normally annealed. In this case, the screen masks the glass only after a certain period of heating, the part which is to have less temper or no temper being then, during this period, heated the same way as the remainder of the sheet. This period is, in the example represented, that of the location of the sheet at position A. During this period, the screen 10a—10b is kept away from the sheet in a lateral direction, although inside the furnace, where, in consequence, it is heated itself.

After the sheet has remained at position A for a period approximately equal to a third of its total stay in the furnace, it is moved to position B. By a device described later, the screen is then lowered to mask the desired region of the sheet. The screen remains then in place during the final period of heating (position C) and so protects the zone against the heat within and radiation of the furnace, so that on leaving it, the said region is not as hot as the rest of the sheet.

At the moment the sheet is placed in the cooling apparatus 5, its temperature is much lower in the part that is to remain untempered or slightly tempered, than in the environal zone. In the example under discussion, the screen remains in place during the rapid cooling or chilling, which may be accomplished by any convenient means, such as jets of air projected onto the sheet from nozzles 11 fitted in tanks fed by compressed air. The screen plays then an insulating part against the effect of the cooling jets and since it is integral with the carriage which supports the sheet and independent of the blowing tanks, the latter may be given any desired motion of displacement parallel to the plane of the sheet, for example, a circular motion by means of eccentrics 13 rotating about axes 14, while the blowing is excluded from the part bounded or masked by the screens.

The lowering of the screen 10a—10b or the guiding thereof into lowered position relative to the sheet, such as anticipated when it occupies position B, is facilitated by a device represented in detail in FIGS. 2 and 3. A handle 15 turning about an axis 16 supported by the carriage beam 6 is equipped at its lower end with a hook 17 from which the screen holder 18 is suspended by means of a rod 19. Pushing the end of the handle 15 which emerges on the outside of the furnace causes the unhooking of the screen holder, which then drops and lodges close to or against the sheet of glass. In this descent the screen holder is guided by metal pieces 20 between which the ends of the bar 19 passes. These slotted guide bars are affixed to the movable carriage at longitudinally displaced points therealong and extend downwardly therefrom into the furnace through the longitudinal slot along the top thereof. The bottom part of pieces 20 serves further as stop of the downward motion as represented in FIG. 2. The vertical slots 20a in the metallic guide bars 20 serve to guide the ends of each suspension rod 19 when it is released from its raised position (FIG. 3), to permit it to drop to its lowered position shown in FIG. 2. In the former position the screen holder 18 is elevated so that the screens 10a and 10b are laterally clear of the sheet of glass, while in the latter position the screens are disposed adjacent to the sheet of glass to exercise a shielding effect thereon. The screens utilized can be of insulating material such as asbestos, or conductive material such as metal (steel, brass, etc.) or a combination of such materials. It will be of advantage to select a material or a combination of materials such that the screen is able to pass through the cycle of successive heating and cooling of manufacturing in quantities by sensibly resuming the same temperature for each heating and cooling so as to assure constantly the same thermic protection.

Figure 4:
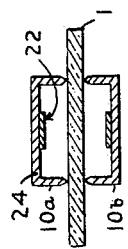
Figure 7:
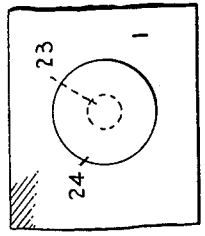
Figure 5:
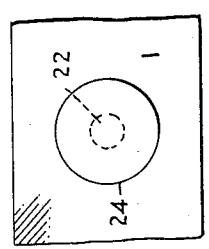
Figure 9:
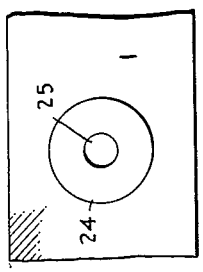

The shape of the screens is preferably that of a cover or lid, formed of a circular top with a cylindrical flange extending from the periphery of the top (FIGS. 4 to 7). The edges of the flanges, by resting against the sheet of glass during treatment, keep the interior portions or main area at a proper distance to assure the desired protection. It may be of interest to give the screen a non-uniform thickness to obtain controllable effects of intermediary temper between complete absence of temper and appreciable temper. In particular, applicants have obtained satisfactory results by using screens such as represented in FIGS. 4 and 5 (section and elevation) and 6 and 7 according to which the screen is made of metal plate of which the center is of a greater thickness 22, or lesser thickness 23, than the annular part 24. Of course, if the reserved part of the glass sheet, i.e., untempered or slightly tempered part, is to have the form of a circle, the screen must have a shape corresponding to it. For example, if the band is to have a circular shape, the screen should have the shape of an annulus or ring of suitable width, such as shown in FIGS. 8 and 9, in which the screen has a cavity 25 in the center to let the heat within the furnace as well as the cooling air blasts reach the glass.

It has been found that the opening 25 can be fitted advantageously with a sieve, wire mesh, perforated plate or similar foraminous material 25a, as shown in FIG. 8a, capable of letting only a portion of the heat within the furnace through as well as a portion of the cooling air. In the product thus obtained the central block or islet presents a certain mechanical resistance due to partial temper, but shatters in case of breakage in pieces large enough to assure sufficient visibility.

FIG. 10 shows the fracture of tempered glass with a part reserved according to the invention. It is seen that the lines of fracture of the glass in the environal zone which are directed toward the center of the reserved part, start an inflexion by arriving in its vicinity and stop without entering the reserved part, which is explained by the fact that the said part is in the state of compression. Bordering the reserved part, the glass shows the same type of breakage, characteristic of safety temper, as in the rest of the environal zone.

In FIGURES 11 and 12, the screen is made of a single metal sheet 26 having a cavity 25. The metal sheet 26 is maintained at a fixed distance from the surface of the glass sheet by the rigid rods 27 formed in the shape of a yoke which straddles the glass sheet and the spacing members or nogs 28 which are integral with the rigid rods 27 and which are preferably copper and thin members of high heat conductivity.

The applicants have found in fact that it is advantageous to provide a certain gap between the outer edge 29 of the screen and the glass sheet, at least during the cooling period by blowing. Such arrangement enables the reserved part and, in particular its outer edge, to cool between the beginning of the blowing and the moment the environal zone solidifies. Thus, as above explained, the temperature of the glass in the reserved part when blowing begins, may be higher than the solidification temperature.

Moreover, the mode of keeping the screen at the correct distance from the glass sheet by means of thin nogs 28 made of copper (or of any very good conducting metal) has been recognized as bringing no risk of breakage during the changes in temperature involved in the method according to the invention, and this mode of spacing is a part of the invention.

In FIGS. 13 and 14 the screen 30 is hollow and is kept in position by pipes 31 and 32 which also are used as inlet and outlet pipes for a cooling fluid, such as air, which circulates according to the path indicated by arrows. The hollow organ 30 may assume any desired outline in addition to the circular form as shown.

FIG. 15 represents an example of applying the method to a windshield for motorcar. In that windshield, the part to be reserved is placed not in the middle, but near one end, opposite the driver's seat. Very often, windshields are tempered in vertical position as illustrated by FIG. 15, the glass sheet being suspended from the clamps 33 as in known manner. In that case, the applicants have verified that it is advantageous to put the reserved part 34 at the lower part of the glass sheet as illustrated by FIG. 15, the screen 35 passing from the waiting position 35a to the position 35b at the place of the part to be reserved. 36 represents the heating furnace. The advantages of this arrangement are the following ones.

It is known that in the process according to the invention, the zone which environs the reserved part shrinks during the cooling and compresses it in the manner of a hoop. Reciprocally, said environal zone is submitted to a tensile stress which corresponds to the compressive stress that it exerts. If the reserved part is at the top of the glass sheet suspended at one of its small sides, the zone, that environs the reserved part and acts as a hoop, is submitted not only to said tensile stress, but also to the weight of the lower part of the glass sheet and the risk of breakage during the process is increased. On the contrary, this risk of breakage is suppressed practically when the glass sheet is placed, according to the present invention, so that the reserved part is at the bottom of the sheet and the weight of the lower part of said sheet below the reserved part has a relatively low value.

In the application of the invention described it was taken into consideration that the sheet of glass could have more than one reserved zone (disk or circle) without difficulty or fundamental modification of the equipment; the invention includes the realization in which the sheet of glass has several zones answering every desirable relative arrangement.

It also is self-evident that the above described invention in its application to a sheet of glass used as window of a vehicle applies to all types of glass, in order to obtain for example in tempering blocks, insulators, structural glass, etc., parts which are of less temper than the rest of the glass object and which, nevertheless, do not lower the strength and stability of the object.

We claim:

1. In apparatus of the character described, the combination of a heating furnace, a trackway paralleling said furnace, a carriage movable along said trackway, means connected with said carriage for supporting a sheet of glass in its travel into and out of said furnace, a movable screen mounted on said carriage for movement with said sheet of glass into and out of said furnace, and means on said carriage for selectively moving said screen from an inoperative position beyond the boundaries of the sheet into an operative position laterally of the sheet to mask a predetermined portion thereof.

2. In apparatus of the character described, the combination of a heating furnace having a slot in the top wall and extending throughout the length thereof, a trackway paralleling said slot, a carriage movable along said trackway, means connected with said carriage and extending through said slot for supporting a sheet of glass in its travel into and out of said furnace, a movable screen mounted on said carriage for movement with said sheet of glass into and out of said furnace, and means on said carriage mounted externally of the furnace for selectively moving said screen from an inoperative position beyond the sheet into an operative position laterally of the sheet to mask a predetermined portion thereof.

3. An apparatus as set forth in claim 2 wherein said last-mentioned means for selectively moving said screen from inoperative to operative position comprises a pair of longitudinally displaced slotted guide bars mounted on said carriage and extending downwardly through said slot into said furnace, a longitudinally extending rod supporting said screen movable within the slots in said guide bars, and a lever having a projection for supporting said rod in its raised position, said lever extending outwardly from said furnace for actuation to move said projection from its rod-supporting position to liberate said rod and screen from their raised positions so that the screen is capable of dropping into operative position.

4. An apparatus as set forth in claim 1 wherein said movable screen comprises a yoke adapted to straddle said sheet of glass, and an annular screen mounted on said yoke on each side of said sheet of glass.

5. An apparatus as set forth in claim 4, including spacer nogs of thin metal extending from said screen mounting towards said sheet of glass to space the screens equidistantly therefrom.

6. An apparatus as set forth in claim 4 wherein said annular screens are hollow with the yoke serving to support an inlet and outlet for a cooling medium adapted to be circulated through said screens.

7. In apparatus of the character described, the combination of a heating furnace, a chilling apparatus beyond said heating furnace, a trackway paralleling said furnace, a carriage movable along said trackway, means connected with said carriage for supporting a sheet of glass in its travel into and out of said furnace and into said chilling apparatus adapted to apply a chilling medium onto the opposite faces of the sheet, a movable screen mounted on said carriage for movement with said sheet of glass into and out of said furnace and chilling apparatus, and means on said carriage for selectively moving said screen from an inoperative position beyond the sheet into an operative position laterally of the sheet to mask a predetermined portion thereof.

8. In apparatus of the character described, the combination of a heating furnace, a chilling apparatus beyond said heating furnace, means for supporting a glass sheet undergoing thermic treatment in the course of its travel into and out of said furnace and into said chilling apparatus adapted to apply a chilling medium onto the opposite faces of the sheet, a movable screen for masking a predetermined part of the glass sheet comprising a plate spaced from and parallel to the sheet, said plate being of great heat absorbing capacity and of substantial thickness with the thickness at one portion thereof being greater than that of another portion, and supporting means for said movable screen adapted to move said screen from an inoperative position beyond the boundaries of the glass sheet into an operative position laterally of the sheet to mask said part thereof during at least the concluding period of the heat treatment of said sheet within the heating furnace.

9. In apparatus of the character described, the combination of a heating furnace, a chilling apparatus beyond said heating furnace, means for supporting a glass sheet undergoing thermic treatment in the course of its travel into and out of said furnace and into said chilling apparatus adapted to apply a chilling medium onto the opposite faces of the sheet, a movable screen for masking a predetermined part of the glass sheet comprising a plate of great heat absorbing capacity and of substantial thickness having the main surface of the plate spaced from and parallel to the sheet with marginal portions of small cross-section extending transversely of the margin of the plate for engagement with the glass sheet, and supporting means for said movable screen adapted to move said screen from an inoperative position beyond the boundaries of the glass sheet into an operative position laterally of the sheet to mask said part thereof during at least the concluding period of the heat treatment of said sheet within the heating furnace.

10. An apparatus as set forth in claim 9 wherein said supporting means for said movable screen maintains said screen in fixed position relative to the glass sheet in the course of movement of the glass sheet from the heating furnace to the chilling apparatus.

11. An apparatus as set forth in claim 9 wherein said supporting means for said movable screen maintains said screen in fixed position relative to the glass sheet in the course of movement of the glass sheet from the heating furnace to the chilling apparatus as well as during the application of the chilling medium to the opposite faces of the glass sheet.

12. An apparatus as set forth in claim 9 wherein said supporting means for the movable screen moves the screen to its inoperative position beyond the boundaries of the glass sheet at the end of the heat treatment.

13. An apparatus as set forth in claim 9 wherein the plate is thicker at one portion thereof than at another.

14. An apparatus as set forth in claim 13 wherein the plate is thicker adjacent to the outer boundaries thereof.

15. An apparatus as set forth in claim 13 wherein the plate is thicker adjacent to the central portion thereof.

16. An apparatus as set forth in claim 9 wherein the movable screen consists of a plate of great heat absorbing capacity with a central opening therein, and said marginal portions of small cross-section consist of flanges extending transversely from the plate at the outer boundary thereof and at the boundary of the central opening for contact of the free ends of the flanges with the glass sheet, to outline a corresponding reserved area of the sheet undergoing thermic treatment.

17. An apparatus as set forth in claim 16 wherein said plate is of annular outline having a circular outer boundary and a circular central opening with the flanges extending transversely therefrom being arranged concentrically.

18. In apparatus of the character described, the combination of a heating furnace, a chilling apparatus beyond said heating furnace, means for supporting a glass sheet undergoing thermic treatment in the course of its travel into and out of said furnace and into said chilling apparatus adapted to apply a chilling medium onto the opposite faces of the sheet, a movable screen for masking a predetermined part of the glass sheet to form an environal zone of strongly tempered glass surrounding a band of lesser or non-tempered glass enclosing a zone of intermediately tempered glass, said screen comprising a circular plate provided with a central opening located on each side of the glass sheet with a foraminous material connected to said plate and extending across said opening, and supporting means for said movable screen adapted to move said screen from an inoperative position beyond the boundaries of the glass sheet into an operative position laterally of the sheet to mask said part thereof during at least the concluding period of the heat treatment of said sheet within the heating furnace.

19. In apparatus of the character described, the combination of a heating furnace, a chilling apparatus beyond said heating furnace, means for supporting a glass sheet undergoing thermic treatment in the course of its travel into and out of said furnace and into said chilling apparatus adapted to apply a chilling medium onto the opposite faces of the sheet, a movable screen for masking a predetermined part of the glass sheet comprising a hollow annular organ adapted to be disposed in a plane parallel to the glass sheet and to be cooled by a cooling medium flowing through the interior thereof, said organ having a single inlet and a single outlet for connecting the circulating cooling medium thereto, and supporting means for said movable screen adapted to move said screen from an inoperative position beyond the boundaries of the glass sheet into an operative position laterally of the sheet to mask said part thereof during at least the concluding period of the heat treatment of said sheet within the heating furnace.

20. In apparatus of the character described, the combination of a heating furnace, a chilling apparatus beyond said heating furnace, means for supporting a glass sheet undergoing thermic treatment in the course of its travel into and out of said furnace and into said chilling apparatus adapted to apply a chilling medium onto the opposite faces of the sheet, a movable screen, smaller in size than the glass sheet, for masking a predetermined part of the glass sheet, said screen comprising a plate of great heat absorbing capacity and substantial thickness spaced from and parallel to the sheet, supporting means for said movable screen adapted to move said screen from an inoperative position beyond the boundaries of the glass sheet into an operative position laterally of the sheet to mask said part thereof during at least the concluding period of the heat treatment of said sheet within the heating furnace, and thin spacing members of a good conducting metal connected to said supporting means and provided with free ends adapted to contact the glass sheet for maintaining said plate spaced a predetermined distance from said glass sheet during said heat treatment followed by the chilling thereof in said chilling apparatus without risking breakage of the sheet during its changes in temperature.

References Cited in the file of this patent

UNITED STATES PATENTS

| | | |
|---|---|---|
| 966,579 | Myers | Aug. 9, 1910 |
| 1,753,779 | Ferngren | Apr. 8, 1930 |
| 1,900,582 | Owen | Mar. 7, 1933 |
| 1,981,560 | Littleton | Nov. 20, 1934 |
| 2,122,088 | Clitherow | June 28, 1938 |
| 2,160,065 | Ford | May 30, 1939 |
| 2,177,324 | Long | Oct. 24, 1939 |
| 2,199,511 | Perry et al. | May 7, 1940 |
| 2,251,160 | Owen | July 29, 1941 |
| 2,336,200 | Von Reis | Dec. 7, 1943 |
| 2,359,222 | Kiehl et al. | Sept. 26, 1944 |
| 2,553,945 | Schrader | May 22, 1951 |
| 2,762,166 | Vent | Sept. 11, 1956 |

FOREIGN PATENTS

| | | |
|---|---|---|
| 826,690 | France | Jan. 12, 1938 |
| 525,732 | Great Britain | Sept. 3, 1940 |
| 934,286 | France | Jan. 10, 1948 |
| 606,756 | Great Britain | Aug. 19, 1948 |